Dec. 6, 1966      E. D. MILLER ETAL       3,289,868
           LIFT SYSTEM FOR CARGO CONTAINERS
Filed Dec. 16, 1964                     2 Sheets-Sheet 1
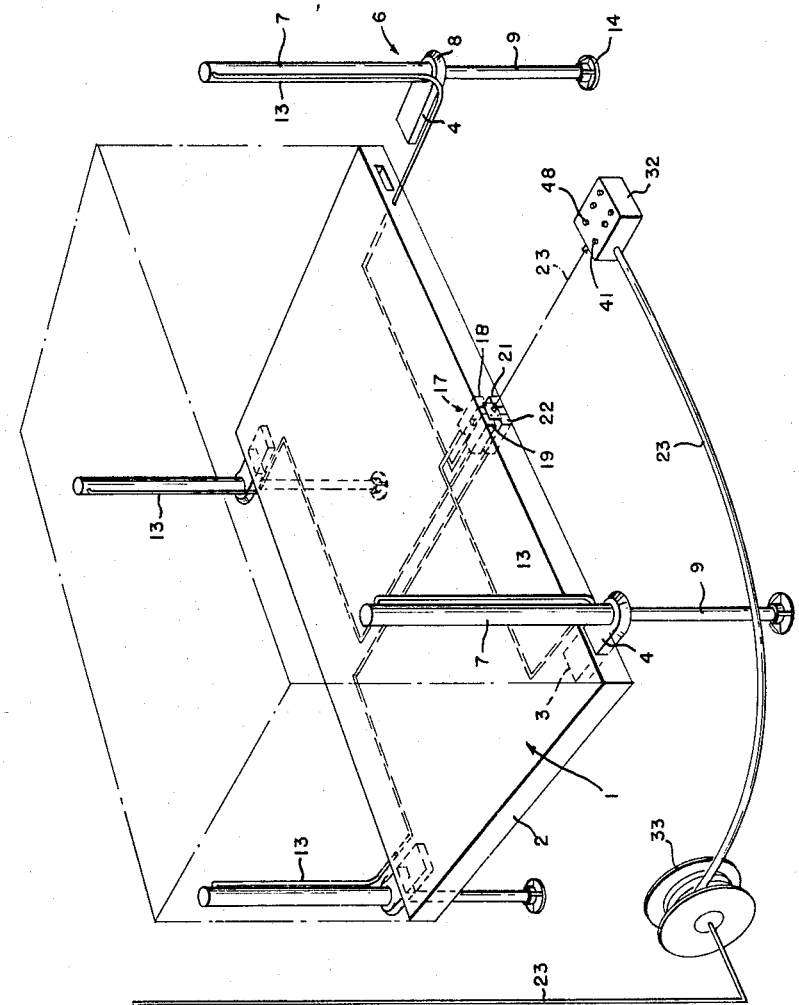
EDWARD D. MILLER
HAROLD T. KLEIN
RONALD R. ANDERSON
     *INVENTORS*
BY 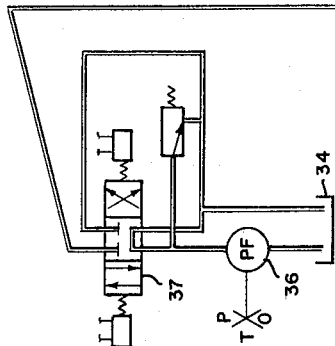
*ATTORNEYS*

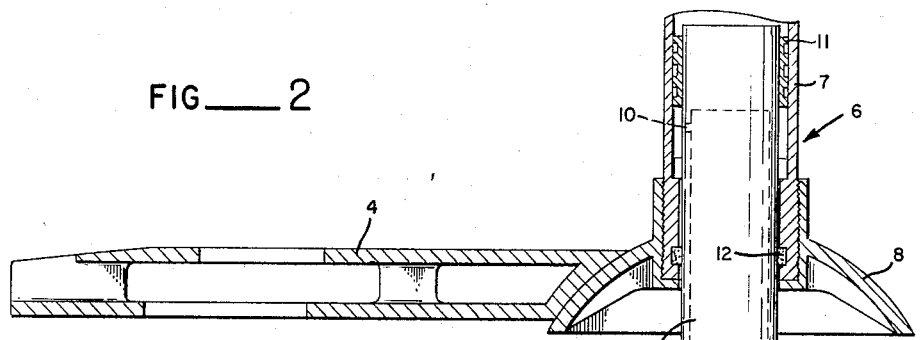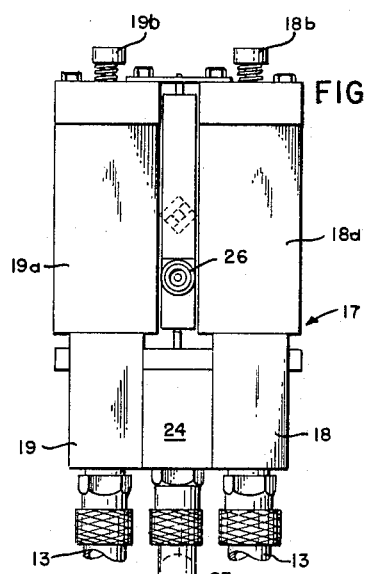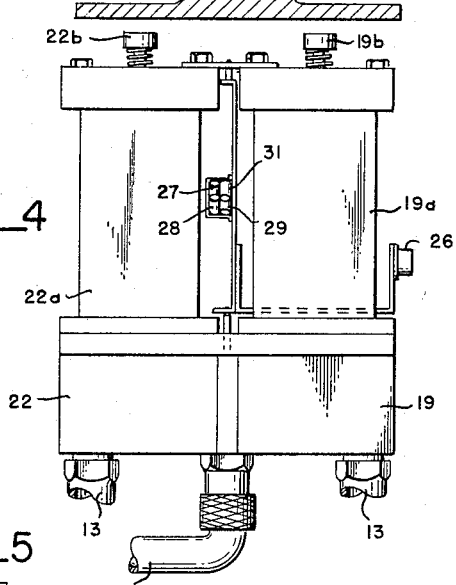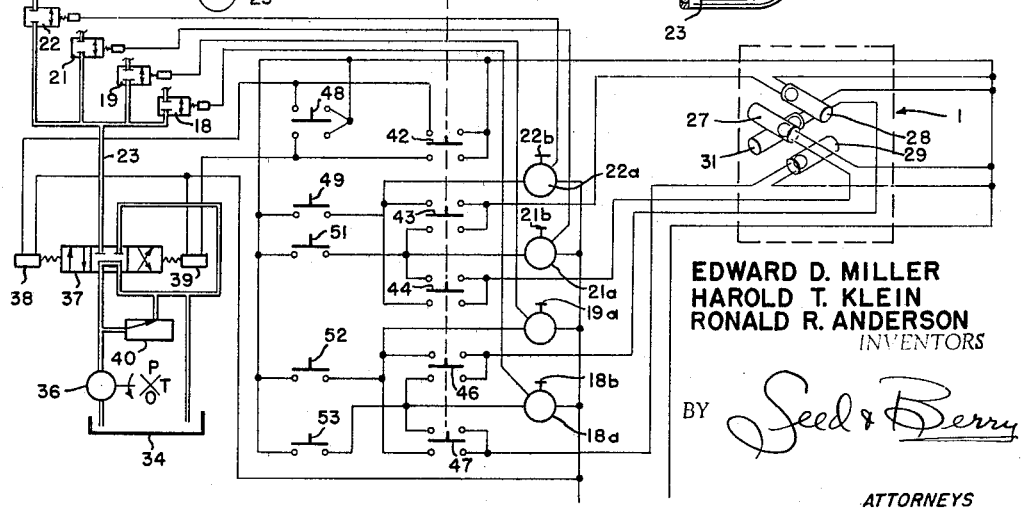

United States Patent Office 3,289,868
Patented Dec. 6, 1966

3,289,868
LIFT SYSTEM FOR CARGO CONTAINERS
Edward D. Miller and Harold T. Klein, Bellevue, and Ronald R. Anderson, Everett, Wash., assignors, by mesne assignments, to Jack Neun, Portland, Oreg., and Edward D. Miller, Seattle, Wash.
Filed Dec. 16, 1964, Ser. No. 418,779
9 Claims. (Cl. 214—515)

The present invention relates in general to a system for handling removable cargo containers or platforms of the type suitable for placement on a truck, tractor-trailer combination or railroad car, for transport and for removal for further handling at the point of delivery. More particularly, the present invention relates to demountable lifting devices for cargo containers or platforms and the like with a novel fluid pressure and electrical control system whereby the container or platform may be maintained level during raising and lowering regardless of irregularities in the ground or other support surface beneath the container.

One object of the present invention is, therefore, to provide a demountable lifting means and control system adaptable for use on removable cargo containers and the like with provision for automatically maintaining the container in a level condition during lifting and lowering.

Another object of the present invention is to provide a demountable lifting means and control system therefore of the character described whereby one man may easily load and unload a cargo container from a vehicle such as a truck, trailer or railroad car.

Another object of the present invention is to provide a control system for a demountable lifting means of the character described whereby a plurality of fluid pressure rams may be operated simultaneously and automatically adjusted to maintain the container in a level condition regardless of ground or support surface irregularities.

A further object of the present invention is to provide a demountable lifting system of the character described which is inexpensive and which is relatively maintenance free and can be carried from one location to another along with the cargo container.

A still further object of the present invention is to provide a demountable lifting system of the character described which is adapted to be powered from the hydraulic or power take-off system of conventional vehicles or independent mobile source of power, as well as from a permanent structure such as a vanning dock or the like.

Other more particular objects and advantages of the invention, will, with the foregoing, appear and be understood from the following description and claims, the invention consisting of the novel construction and adaptation and combination of parts hereinafter described and claimed.

Reference is now made to the accompanying drawings in which:

FIG. 1 is a perspective view of the lifting apparatus and control system applied to a cargo container;

FIG. 2 is a detail cross-section of the lower portion of one of the lifting rams;

FIG. 3 is a plan view of a solenoid valve unit incorporating the leveling device;

FIG. 4 is a side elevation of the solenoid valve unit shown in FIG. 3; and

FIG. 5 is a hydraulic and electrical schematic of the control system.

Referring now to the drawings wherein like reference numerals indicate identical parts in the various views, FIG. 1 shows the lifting devices and the control system as applied to a cargo container indicated generally at 1. The container 1 may be of any conventional structure and will be adapted to be mounted on a mounting base or platform 2 which is provided with guide sockets or mounting receptacles 3 adjacent each corner. The mounting base 2 may be designed to receive any conventional container or may in some instance, be made a permanent part of the container structure. The guide sockets 3 are designed to receive the lateral lifting arms or brackets 4 of the lifting rams 6. As shown by way of example in FIG. 1, the sockets 3 may be located adjacent each corner of the container and may be of any configuration so as to receive the lift arms 4. Other details of the mounting base 2 of the container form no part of the present invention but will usually include means for securing the base 2 to the bed of a truck, trailer or railroad car, as is conventional in the prior art. It will be understood that the lift arms 4 of the ram units 6 are freely slidable within the socket 3 of the container, with the container being supported on the four arms 4 of the rams during lifting and lowering which will later be explained in detail.

Referring now to the FIG. 2, each ram unit 6 includes a hollow cylinder portion 7 having a flange 8 secured to its lower end by any means such as the screw threaded attachment shown. In the alternative, the flange 8 may be welded or otherwise affixed to the bottom end of the cylinder 7. The lifting arms 4 extend laterally from the flange 8 and may be welded or otherwise permanently attached thereto. The lifting arms 4 may take any configuration desired but will be constructed so as to be freely insertable into the socket 3 of the container. Telescopingly received in the cylinder 7 is a hollow piston rod 9 with a transfer port 10. The rod 9 carries a fluid seal 11 on its upper end and is also sealed with relation to the cylinder 7 by means of the annular seal 12 carried by the bottom end of the cylinder. As indicated in FIG. 1, fluid pressure is admitted and exhausted from each cylinder 7 by the conduits 13 fitted to the upper end of the cylinders above the pistons 9. In the present instance, a slight amount of a suitable gas pressure may be maintained between the seals 11 and 12 to provide the desired amount of return force for normally holding the piston rod 9 retracted within the cylinder. The transfer port 10 in the hollow piston rod provides for increased gas capacity. A ground engaging shoe 14 is pivoted to the bottom end of each piston rod 9 by means of a pivot pin such as the pin 16 to allow the shoe 14 to engage the ground or other surface which may be uneven. Although only four such ram units 6 are illustrated in FIG. 1, it will be understood, of course, that any number of lift rams could be adapted for use about the sides of the container.

A solenoid valve unit, indicated generally at 17 in FIG. 1 and shown in detail in FIGS. 3 and 4, may be permanently mounted within the base portion 2 of the container or adapted to be removably attached thereto. The valve unit in the present embodiment includes four single flow path valves 18, 19, 21 and 22 which are controlled by the solenoids 18a, 19a, 21a and 22a respectively. Identical conduits 13 connect the respective valves to the cylinders 7 and the rams 6. A fluid pressure conduit 23 connects the valves to a source of fluid pressure through the manifold 24 as illustrated in detail in FIG. 5. Also carried by the valve unit 17 is a conventional spirit level 26 and four mercury switches 27, 28, 29 and 31 which cooperate with the spirit level and the valve unit to provide the automatic leveling action which will be described in detail with relation to electrical and hydraulic control circuits shown in FIG. 5. It will be understood, however, that equivalent switches containing any conductive fluid or mechanical switching devices sensitive to gravity may be substituted for the mercury switches.

The system also includes a control unit 32 with which the operator controls the action of the rams 6 and which contains the various electrical controls to be described in relation to FIG. 5. The control unit 32 may be inserted within the fluid pressure supply line 23 and may include release couplings or the like for convenience. The conduit 23 may comprise a hose or the like carried on a reel 33 so as to allow the operator to move freely about the container while it is being raised or lowered. In the present embodiment, the reel 33 may be carried on a convenient spot on the truck or tracor from which the supply of pressure fluid is obtained. It will be understood that the system of hose connections and source of fluid pressure may be varied as desired for any particular installation of the system and the arrangement shown is by way of example only.

Referring now to FIG. 5, the electrical and hydraulic control circuits for operating the rams 6 will be described in detail. A reservoir 34 and a pump 36 provide the source of pressure fluid and the pump 36 may be driven by the conventional power take-off from a tractor or the like. The main valve 37 which is a three-position solenoid operated valve controls the availability of fluid under pressure to the ram valves 18, 19, 21 and 22. The valve 37 may be in either the blocked condition shown in FIG. 5 or be moved to the right or the left so as to admit pressure to the ram valves or provide return flow from the valve to the reservoir respectively. The valve 37 may be a conventional balanced spool valve which is moved in either direction by means of the solenoids 38 and 39. A pressure relief valve 40 is also provided to protect the system against excess pressure.

The operation of the valve 37 is effected by the direction selector control 41 which is shown in the hold condition in FIG. 5. In this position, all of the switch contacts 42, 43, 44, 46 and 47 are in the open position as shown with the solenoids 38 and 39 being deenergized. When the control member 41 is raised to the "up" position, a circuit is completed through the solenoid 38 to move the valve 37 to the right making pressure fluid available in the conduit 23. At the same time, the contacts 43, 44, 46 and 47 are moved to their "up" position completing circuit through the solenoids 18a, 19a, 21a and 22a to move the valves 18, 19, 21 and 22 respectively to their open position for operating the rams 6. When the control 41 is moved to the "down" position from the "hold" position, the solenoid 39 is energized to move the valve 37 to the left to open the conduit 23 to the return passage to the reservoir as illustrated. In the "down" position of the control 41, the contacts 42, 43, 44, 46 and 47 also energize the solenoids of the respective ram valves to allow pressure fluid in the rams 6 to exhaust to lower the container.

The automatic leveling during raising and lowering of the container is accomplished by means of the four mercury switches 27, 28, 29 and 31 which are mounted on the valve assembly 17. The mercury switches are normally closed switches and will be so mounted on the unit 17 that, when the spirit level 26 is centered, the switches will all be closed. As can be seen from FIG. 5, the mercury switches are so arranged as to represent the $x$ and $y$ axis of a plane which is parallel to the plane of the bottom of the container. The valve unit 17 is initially calibrated by adjusting the mercury switches so that all switches will be closed when the spirit level 26 indicates a level condition. When the valve unit is installed on the container any slope given to the plane of the bottom of the container will cause one or two of the mercury switches to break contact thus deenergizing one or two of the solenoids to move the ram valves of two adjacent rams to the closed position until the container moves again to a level position. In this connection, it will be noted that the mercury switches are each aligned so as to be at an angle with the sides and ends of the container. Following this condition through, assume that the plane of the container is tilted in a direction so as to open mercury switches 27 and 29 while the container was being raised. Once the mercury switch 29 is open, a circuit through the solenoid 18a and the circuit through the solenoid 21a will be broken thus moving the valves 18 and 21 to the hold position. As seen in FIG. 1, the valves 18 and 21 control movement of the rams on one side of the container body which, in this instance, would be the high side of the container. Once the container is again level, the mercury switches will close and all four rams will move again in unison. A similar reaction takes place upon tilting of the container in any direction so as to open any one or two corresponding mercury switches.

If, either initially or at any time during the raising or lowering of the container, the operator wishes to control the rams individually rather than automatically, the valve 37 may be controlled by the switch 48 to move the valve 37 to any one of its three positions while the direction selector 41 is in the hold position. Each individual ram valve 18, 19, 21 or 22 may then be controlled by individual switches 49, 51, 52 and 53. These switches provide a direct by-pass of the mercury switches which have no effect on the circuit when the direction selector 41 is in the hold position. This control is especially valuable when initially inserting the lift arm 4 of the rams since the rams may be individually adjusted in order to engage the lifting arms 4 in the sockets 3.

Each of the solenoids 18a, 19a, 21a and 22a may also be provided with a manual override in order to allow the operator to open the ram valve by hand if necessary. Manual override is provided by the operators 18b, 19b, 21b and 22b respectively as shown in FIGS. 3, 4 and 5.

In utilizing the present system, and assuming that a cargo container or platform is to be unloaded from a truck, trailer, or other vehicle, the valve unit 17 is initially connected to the respective conduits 13 for the four lift rams and the system is ready to function. The operator may then take each individual ram and connect it to one of the conduits 13. Once the ram is connected to the conduit, the manual switch 48 is operated to connect the source of pressure fluid to the ram valves and a particular switch 49, 51, 52 or 53 is closed for extending the rod 9 to the ram to allow the lifting arm 4 of the ram to be inserted in the associated guide socket 3. Each of the ram units 6 is thus placed about the container and the system may then be switched to automatic control by moving the switch 48 to the "hold" position and moving the direction selector 41 to the "up" position. As soon as the container is raised sufficiently, the direction selector 41 is put in the "hold" position and the trailer or truck may be moved from beneath the cargo container. The operator then moves the direction selector 41 to the "down" position and the cargo container is lowered to suitable supports or to ground level with the automatic level control serving to maintain the container in the level position. When the container has come to rest on a suitable support, the rams 6 may be removed and used for unloading or loading other containers. The loading of the container on a truck or trailer is accomplished by the reverse of the above procedure.

It will be readily apparent to those skilled in the art that the present invention provides novel and useful improvements in cargo container lift systems of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In combination with a demountable cargo container, a lift system comprising: a plurality of lift rams for raising and lowering said container, means for detachably connecting said rams to said container, a source of fluid pressure, valve means for controlling the flow of pressure fluid to said rams, electrical circuit means including first switch means for selectively controlling said valve means for raising and lowering said container, and level responsive switch means in said circuit and carried by said container to override said first switch means for causing said rams to move in unison, whereby said container is maintained level during raising and lowering, and manual override switch means in said circuit for operating each ram independently.

2. In combination with a demountable cargo container, a lift system comprising; a plurality of lift rams for raising and lowering said container, said container including socket means adjacent each corner thereof and said lift rams being provided with lift arms removably received in said sockets, a source of fluid pressure, valve means for controlling the flow of pressure fluid to said rams, electrical circuit means including first switch means for selectively controlling said valve means for raising and lowering said container, level responsive switch means in said circuit and carried by said container to override said first switch means for causing said rams to move in unison, whereby said container is maintained level during raising and lowering, and manually operable override switch means in said circuit means for raising and lowering each ram independently.

3. The combination according to claim 1 wherein; said level responsive switch means comprises; a mercury switch operatively connected to control the operation of each ram, and means for mounting said mercury switches on said container whereby said switches are normally closed when said container is level and selected ones are opened when said container is inclined to control the associated ram in such a manner as to cause said container to remain in a level condition during raising and lowering.

4. A lift system for a demountable cargo container comprising in combination; a plurality of lift rams for raising and lowering said container, means for detachably connecting said rams to said container, fluid pressure conduit means connected to said rams, a ram valve in said conduit means associated with each of said rams, main valve means in said conduit means for controlling the flow of pressure fluid from and to said rams, electrical circuit means for controlling said valves, said circuit means including direction selector switch means for controlling the position of said main valve means and maintaining said ram valves in the open position when said main valve means is open to fluid flow, and level responsive switch means in said circuit associated with each ram valve for causing said rams to move in unison, said level responsive switch means being mounted on said container whereby the container is maintained in the level position during raising and lowering, and manual override switch means in said circuit for operating each ram independently.

5. A lift system for a demountable cargo container comprising in combination; a plurality of lift rams for raising and lowering said container, said container including socket means adjacent each corner thereof and said lift rams being provided with lift arms removably received in said sockets, fluid pressure conduit means connected to said rams, a ram valve in said conduit means associated with each of said rams, main valve means in said conduit means for controlling the flow of pressure fluid from and to said rams, electrical circuit means for controlling said valves, said circuit means including direction selector switch means for controlling the position of said main valve means and maintaining said ram valves in the open position when said main valve is open to fluid flow, level responsive switch means in said circuit associated with each ram valve for causing said rams to move in unison, said level responsive switch means being mounted on said container, whereby the container is maintained in the level position during raising and lowering, and manually operable override switch means for raising and lowering each ram independently.

6. The combination according to claim 5 wherein; said rams include a cylinder portion and a piston portion having a piston rod, a first chamber on one side of the piston for receiving fluid pressure from said conduit means, and a second chamber on the other side of said piston, said second chamber being closed and filled with a compressible gas, whereby said pressure fluid operates to extend said rod and said compressible gas retracts said rod.

7. In combination with a cargo container adapted for mounting on a movable vehicle, a lifting system comprising; a plurality of lift rams, means for detachably connecting said rams to the container for raising and lowering the same, a source of fluid pressure, conduit means for connecting said source to each of said rams, a plurality of ram valves in said conduit means, each ram valve being associated with a respective ram for controlling the flow of pressure fluid thereto, a main control valve in said conduit means between said source and said ram valves, said main valve having a closed position and first and second open positions for admitting or exhausting pressure fluid from said rams, electrical circuit means for controlling said valves, selector switch means serving to open said ram valves when said main valve is in either of the open positions, mercury switch means in said circuit for controlling each individual ram valve, and means for mounting said mercury switches on said container whereby said switches are normally closed when said container is level and selected ones are opened when said container is inclined to cause closing of an associated ram valve in such a manner as to cause said container to remain in a level condition during raising and lowering, and manual override switch means in said circuit for operating each ram independently.

8. In combination with a cargo container adapted for mounting on a movable vehicle, a lifting system comprising; a plurality of lift rams, said container including socket means adjacent each corner thereof and said lift rams being provided with lift arms removably received in said sockets, a source of fluid pressure, conduit means for connecting said source to each of said rams, a plurality of ram valves in said conduit means, each ram valve being associated with a respective ram for controlling the flow of pressure fluid thereto, a main control valve in said conduit means between said source and said ram valves, said main valve having a closed position and first and second open positions for admitting or exhausting pressure fluid from said rams, electrical circuit means for controlling said valves, selector switch means serving to open said ram valves when said main valve is in either of the open positions, mercury switch means in said circuit for controlling each individual ram valve, means for mounting said mercury switches on said container whereby said switches are normally closed when said container is level and selected ones are opened when said container is inclined to cause closing of an associated ram valve in such a manner as to cause said container to remain in a level condition during raising and lowering, and manually operable override switch means in said circuit means for raising and lowering each ram independently.

9. The combination according to claim 8 wherein; said rams include a cylinder portion and a piston portion having a piston rod, a first chamber on one side of the piston for receiving fluid pressure from said conduit means, and a second chamber on the other side of said piston, said second chamber being closed and filled with a compressible gas, whereby said pressure fluid operates to extend said rod and said compressible gas retracts said rod.

References Cited by the Examiner
UNITED STATES PATENTS

| | | | |
|---|---|---|---|
| 2,229,530 | 1/1941 | South | 280—6 |
| 2,359,961 | 10/1954 | Anthony. | |
| 3,002,760 | 10/1961 | Lee | 214—515 X |
| 3,074,576 | 1/1963 | Peterson | 214—515 |
| 3,164,275 | 1/1965 | Schatzl et al. | 214—515 |

GERALD M. FORLENZA, *Primary Examiner.*

ALBERT J. MAKAY, *Examiner.*